United States Patent [19]

MacKenzie et al.

[11] 3,913,942

[45] Oct. 21, 1975

[54] STABILIZER PAD FOR EARTH-MOVING APPARATUS

[76] Inventors: Robert A. MacKenzie, 181 Morton St., Stoughton, Mass. 02072; Andry Lagsdin, 63 Chard St., East Weymouth, Mass. 02169

[22] Filed: Aug. 24, 1973

[21] Appl. No.: 391,043

Related U.S. Application Data

[63] Continuation-in-part of Ser. No. 342,684, March 19, 1973.

[52] U.S. Cl. ............................. 280/150.5; 212/145
[51] Int. Cl.² ........................................... B60S 9/02
[58] Field of Search ......... 280/150.5; 182/111, 108; 248/188.8, 357; 212/145

[56] References Cited
UNITED STATES PATENTS

| | | | |
|---|---|---|---|
| 3,630,544 | 12/1971 | Grisham | 280/150.5 |
| 3,721,458 | 3/1973 | Mitchell | 280/150.5 |

FOREIGN PATENTS OR APPLICATIONS

| | | | |
|---|---|---|---|
| 492,912 | 2/1952 | Canada | 182/111 |

Primary Examiner—Robert R. Song
Attorney, Agent, or Firm—Wolf, Greenfield & Sacks

[57] ABSTRACT

Earthmoving equipment especially of the loader/backhoe type is provided with hydraulically operated stabilizer arms having stabilizer pads associated therewith. The pad is a reversible stabilizer pad having a flanged surface for engagement with gravel, for example, and a somewhat resilient surface for engagement with concrete, for example. In one embodiment the pad is provided with an arm accommodating notch and pivots easily so that either surface may be the engaging surface. The pad may have a stop associated therewith which limits the rotation of the pad through an angle somewhat greater than 180°. In another embodiment the pad is substantially non-rotatable with its resilient surface maintained in a downward facing position, and a pivoted cleat is provided that may be rotated to and away from a terrain engaging position.

7 Claims, 19 Drawing Figures

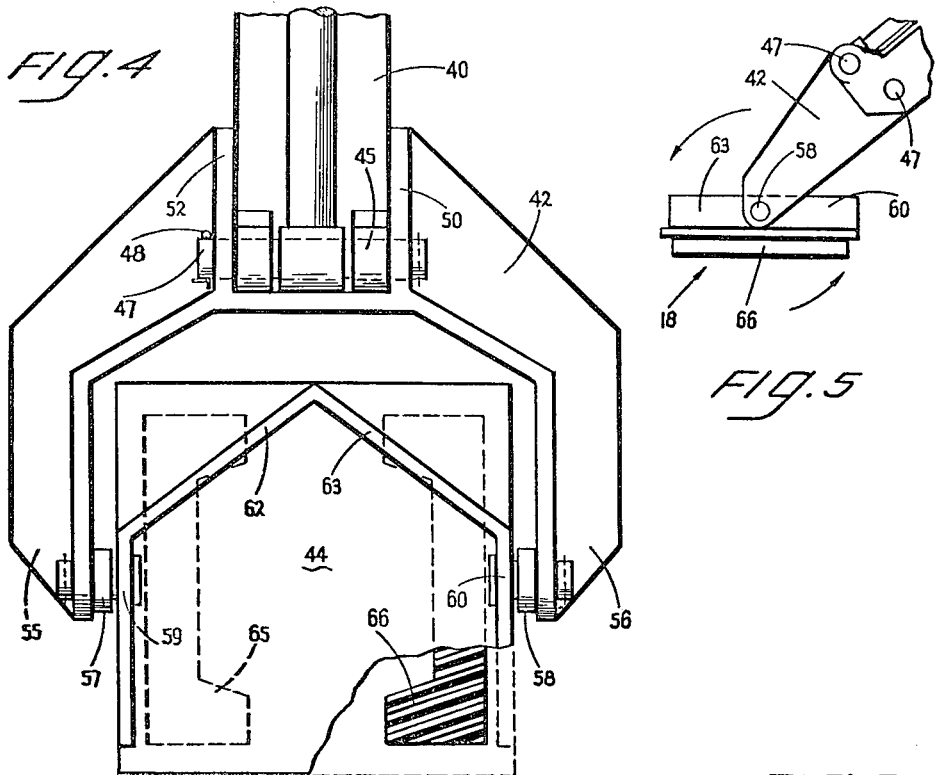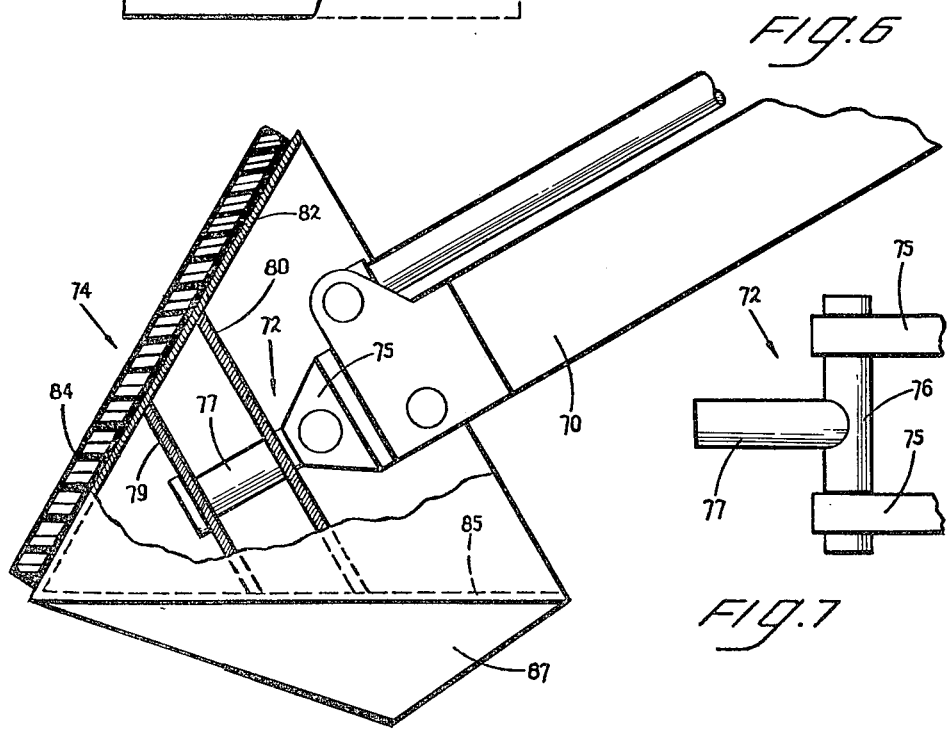

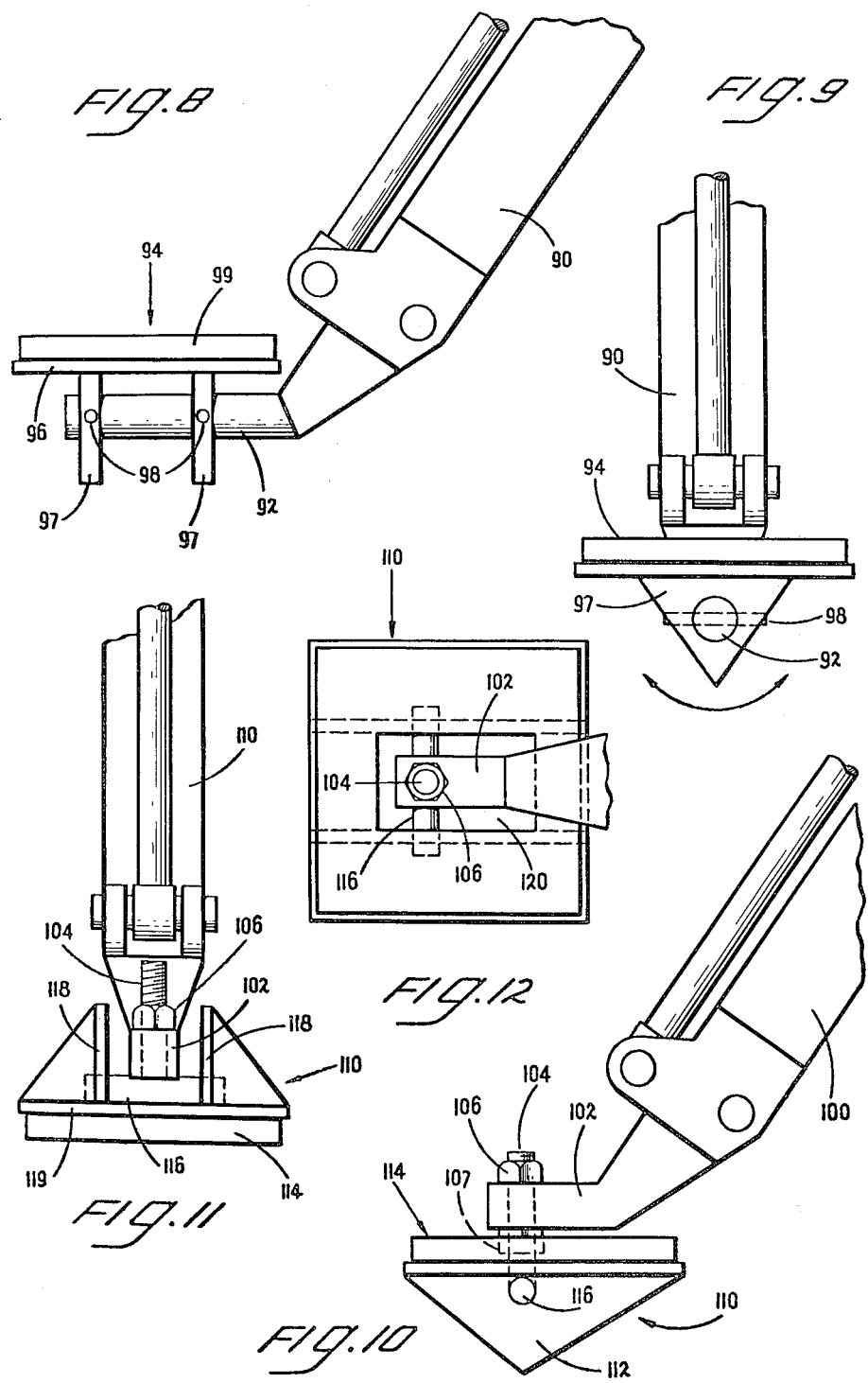

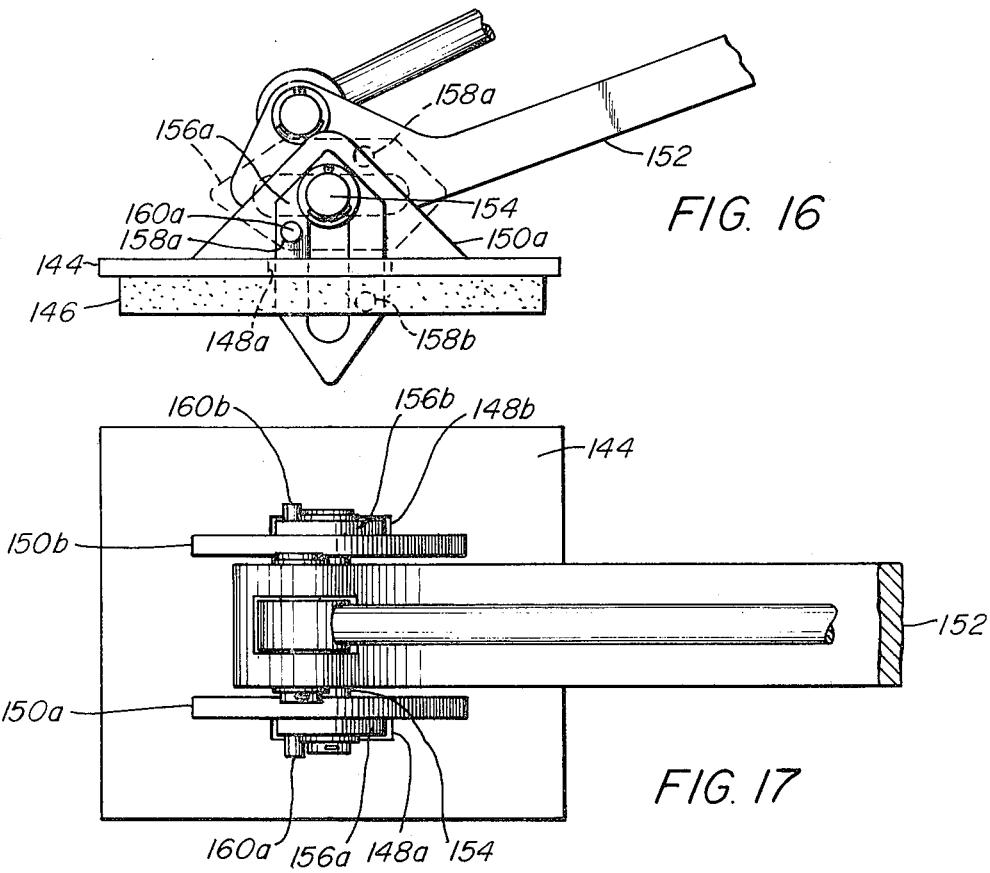
FIG. 16
FIG. 17
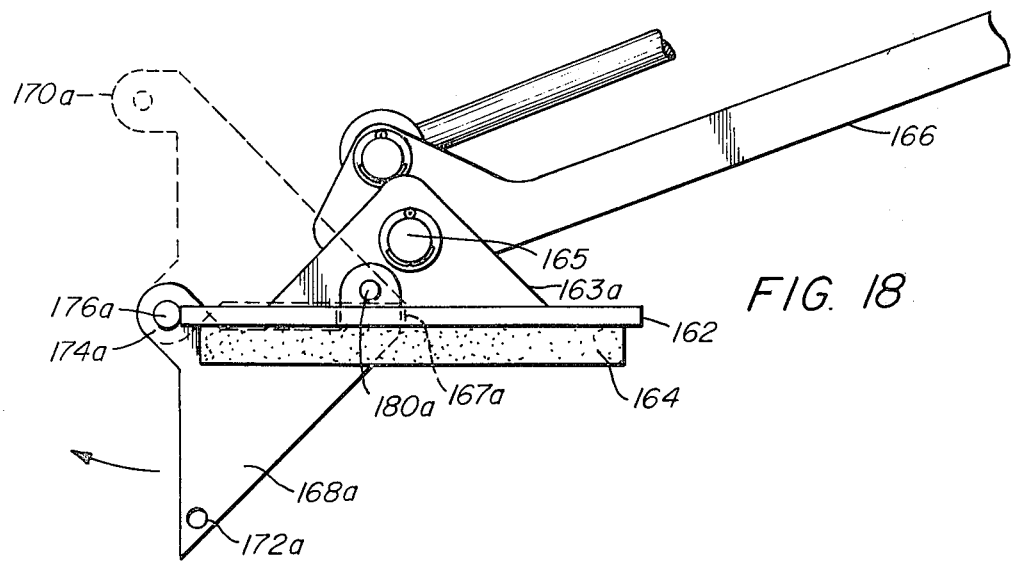
FIG. 18

STABILIZER PAD FOR EARTH-MOVING APPARATUS

RELATED APPLICATIONS

This is a continuation-in-part of application Ser. No. 342,684, filed Mar. 19, 1973.

FIELD OF THE INVENTION

The present invention relates in general to a stabilizer pad for use with earthmoving apparatus. More particularly, the present invention is concerned with a stabilizer pad of improved design and which is reversible so that it may be used on either concrete, for example, or a more yielding surface such as gravel.

BACKGROUND OF THE INVENTION

A loader/backhoe is a relatively small piece of earthmoving apparatus that has been used quite extensively in recent years. This equipment includes a backhoe that may be used for digging trenches for example. In operating the backhoe it has been found necessary to provide sidewardly extending support arms that are usually hydraulically operated. These support arms have stabilizer pads connected at their ends and these pads and arms together provide stabilization for the equipment during a digging operation.

Typical prior art patents that show equipment of this type are U.S. Pat. Nos. 3,215,282; 3,360,544; 3,635,364; and 3,534,877. One of the problems with the presently used equipment is that the stabilizer pads have to be changed, sometimes too frequently, depending upon the condition of the ground upon which the stabilizer pads rests. For example, if the stabilizer pads are resting on concrete or asphalt a stabilizer pad is used having a resilient surface that does not dig into the asphalt. Alternatively, if the stabilizer pads are resting on gravel then the pad must be changed to one having one or more flanges that dig into the earth so as to provide a better engagement.

Because these stabilizer pads have to be changed depending upon the surface upon which the equipment is used, there is time lost and it sometimes takes up to one hour to make the complete changeover. At other times, when there is not sufficient time to make the changeover and the flanged side is down, for example, then the contractor inserts plywood or the like between the stabilizer pad and the asphalt. At best, this is only a temporary measure and eventually it is quite likely that the plywood will either have to be replaced or repositioned. If the flanged surface is used without the insertion of plywood then the asphalt surface is marked up or torn up.

Our previous application Ser. No. 342,684, filed Mar. 19, 1973, discloses an improved stabilizer pad for earthmoving apparatus; the pad having a resilient surface on one side, for use on rigid terrain, and a flanged surface on the other side, for use on a more yielding terrain. The pad is removable so that one or the other surface may engage the terrain. However, a problem has arisen in that when the flanged surface is engaging the terrain the pad may rotate so that the front crossmember of the pad contacts the hydraulic piston rod of the stabilizer arm thereby causing possible damage thereto.

OBJECTS OF THE INVENTION

Accordingly, it is an object of the present invention to provide an improved stabilizer pad for use with earthmoving apparatus preferably of the loader/backhoe type.

Another object of the present invention is to provide a stabilizer pad in accordance with the preceding object and that is reversible between alternate positions. The pad is preferably provided with a resilient surface and a flanged surface opposite to the resilient surface. In another arrangement the pad is essentially non-reversible and a cleat or the like is provided that is reversible.

A further object of the present invention is to provide an improved stabilizer pad that need not be removed from the earthmoving equipment in order to change from a gravel engaging position to an asphalt engaging position.

Still another object of the present invention is to provide a stabilizer pad in accordance with the preceding object wherein the change from one position of operation to the other is accomplished quite readily.

A further object of the invention is to provide a stop means associated with the stabilizer pad for limiting its rotation to prevent damage to the hydraulic system associated with the arm for supporting the pad.

SUMMARY OF THE INVENTION

To accomplish the foregoing and other objects of this invention, there is provided an improved stabilizer pad for earthmoving apparatus. Usually a pair of these pads are used with a typical loader/backhoe. Each pad is formed so that the same pad may be used on both rigid and resilient terrain. Thus it is no longer necessary to change stabilizer pads when different terrain is encountered.

In one embodiment each pad is formed with opposed surfaces, one of the surfaces having flange means extending therefrom and the other of the surfaces having resilient means associated therewith. The pad is supported by means which permit reversal of the pad so that either of the surfaces may be the downwardly facing surface. In one case the pad is formed of a substantially square piece of metal having metal flanges extending from one side. This pad is cut out to fit about the end of the stabilizer arm. A pivot pin secures through the flanges and the end of the arm thus making the stabilizer pad rotatable. The other side of the pad is formed with rubber pads for engagement with asphalt or concrete, for example.

A stop may be used to prevent complete 360° rotation of the stabilizer pad, thereby preventing the pad from contacting the hydraulic piston arm assembly when working in rough terrain.

The stabilizer pad of this invention may also be formed in other arrangements. One such other arrangement requires a modification of the arm of the loader so that the end of the arm is cylindrical in shape. A stabilizer pad may then be secured to this cylindrical portion of the arm and is rotatable thereabout. The pad may be secured in either of its two alternate positions by appropriate locking means.

In another embodiment of the invention the stabilizer pad has a resilient surface and is hinged to the support arm, but is not freely rotatable through a large angle. The pad contains a pivoted cleat that can be rotated into the down position engaging yielding terrain, or rotated into the up position, leaving only the resilient surface in contact with a more rigid terrain.

BRIEF DESCRIPTION OF THE DRAWINGS

Numerous other objects, features and advantages of the invention will now become apparent upon a reading of the following detailed description taken in conjunction with the accompanying drawings in which:

FIG. 4 is a plan view of another embodiment of the stabilizer arm and stabilizer pad;

FIG. 5 is a side view of the arrangement shown in FIG. 4;

FIG. 6 is a side view partially cut away of another embodiment of the invention;

FIG. 7 shows the interconnecting pin depicted in FIG. 6;

FIG. 8 is a side view of another embodiment of this invention;

FIG. 9 is a front view of the stabilizer arrangement shown in FIG. 8 with the stabilizer pad in its gravel engaging position;

FIG. 10 is still another embodiment of the invention in a side view;

FIG. 11 shows a front view of the arrangement shown in FIG. 10 with the stabilizer pad reversed;

FIG. 12 is a plan view of the stabilizer pad shown in FIG. 10;

FIG. 16 is a side view of another embodiment of the invention showing the rotatable cleat in alternate positions;

FIG. 17 is a plan view of the arrangement shown in FIG. 16;

FIG. 18 is a side view of another embodiment of the invention;

DETAILED DESCRIPTION

Figure 1:
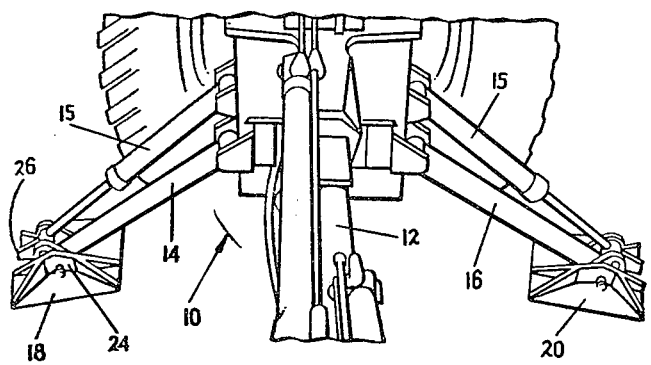
FIG. 1 is a fragmentary view of a typical loader/backhoe having the stabilizer pads of this invention secured thereto.

FIG. 1 is a fragmentary view of a typical loader/backhoe 10 showing the shovel mechanism 12, stabilizer arms 14 and 16, and associated stabilizer pads 18 and 20. A hydraulic piston 15 may operate each of the stabilizer arms 14 and 16 independently. When the equipment is being moved the pistons associated with each cylinder are withdrawn so that the support arms are elevated above ground level. Alternatively, when the support arms are to be used the pistons associated with each of the cylinders are extended to the position as substantially shown in FIG. 1.

The stabilizer pad 18 generally includes a flat plate 22 having triangular flanges 24 and 26 (see FIG. 1) extending from one surface. The pad is also provided with supporting ribs 28, two such ribs being provided for supporting each of the triangular flanges 24 and 26.

Figure 3:
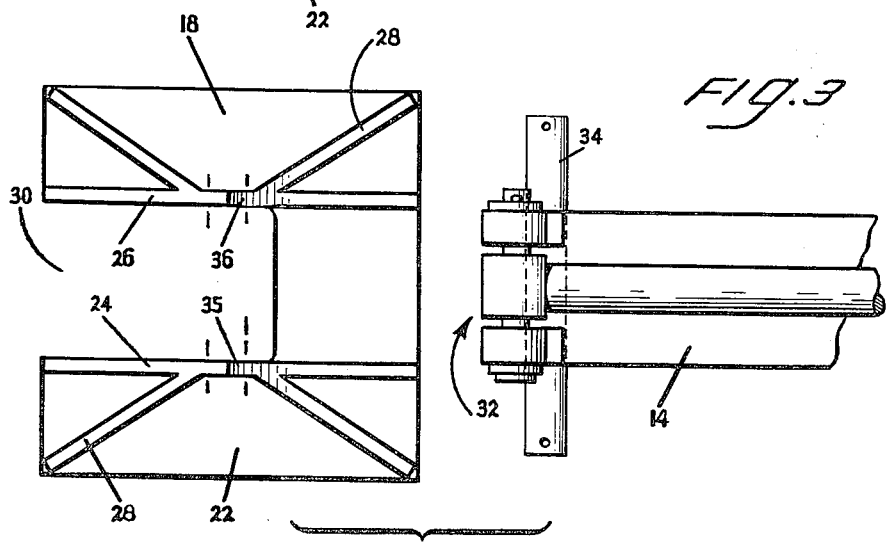
FIG. 3 is an exploded plan view of the stabilizer pad of FIG. 2 in its asphalt engaging position.

The plate or stabilizer pad is notched at 30 between flanges 24 and 26 so as to accommodate arm 14. Arm 14 includes a journal end 32 for accommodating pin 34. Pin 34 also fits within holes 35 and 36 of flanges 24 and 26, respectively. The pin 34 may be secured in place by means of a typical cotter pin, or the pin 34 may be threaded to accommodate a bolt. FIG. 3 shows the flanged side of the stabilizer pad.

Figure 2:
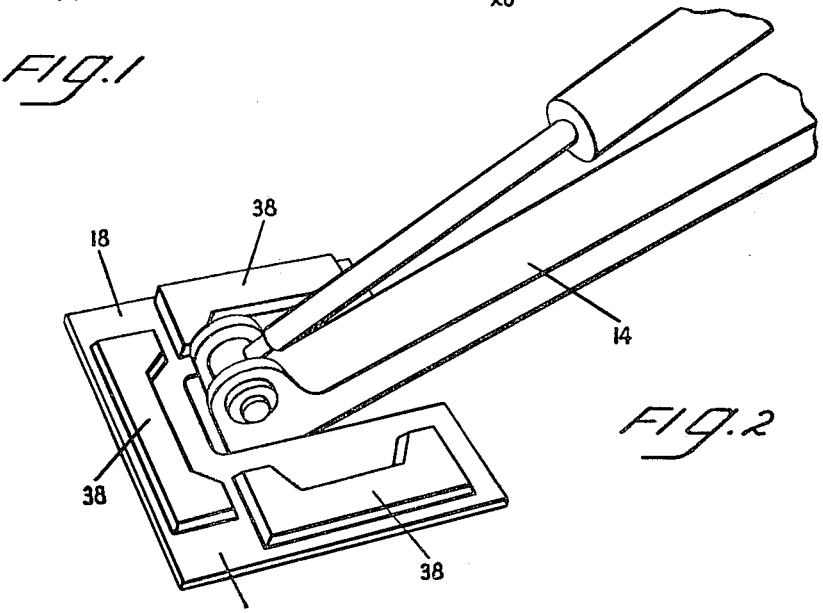
FIG. 2 is a perspective view of one of the stabilizer pads of FIG. 1 in its gravel engaging position.

Alternatively, in FIG. 2 there is shown the resilient side of the pad which comprises rubber stops 38, three of which are shown in FIG. 2. These stops or pads 38 may be suitably secured to plate 22 such as by being glued thereto, or may be secured in place by screws or bolts (not shown).

In the embodiment shown in FIGS. 1-3 the stabilizer pad 18 is readily rotatable about pin 34 and can be easily moved once the arm is lifted and rotated through 180° to change from one engaging surface to the other.

FIG. 4 shows another arrangement of the present invention. In this case, there is provided a stabilizing arm 40, a yoke 42 and a stabilizer pad 44. The arm 40 is provided with journal means 45 for accommodating pin 47. In the arrangement of FIG. 4, a cotter pin 48 is used for securing the pin 47 in place. The pin 47 also passes through yoke 42. For this purpose the yoke is provided with flanges 50 and 52 each of which has holes for accommodating pin 47.

The yoke 42 is substantially U-shaped and includes extensions 55 and 56. The ends of these extensions are provided with removeable pins 57 and 58, respectively. These pins also pass through respective flanges 59 and 60 of stabilizer pad 44. Suitable cotter pins may be used for securing the pins 57 and 58 in place.

In the embodiment shown in FIG. 4, the stabilizer pad 44 includes flanges 62 and 63 which extends from the surface of the stabilizer pad in a similar manner to the flanges 24 and 26 discussed with reference to FIG. 1. On the underside of the stabilizer pad 44, there are provided resilient pads 65 and 66.

FIG. 5 clearly shows the yoke 42 and the stabilizer pad 18 secured between the spaced extensions of the yoke. It can be readily seen that a stabilizer pad is easily rotatable about the pins 57 and 8 so that either the resilient surface or the flanged surface is placed in its useable position.

FIG. 6 shows another embodiment of the present invention including a support or stabilizer arm 70, pivot mechanism 72, and stabilizer pad 74. The arm 70 includes spaced shoulders 75 for accommodating shaft 76 of pivot mechanism 72. The pivot mechanism 72 shown in FIG. 7 also includes orthogonally disposed shaft 77 which passes through accommodating holes in plates 79 and 80 of the stabilizer pad 74.

A stabilizer pad 74 may be in the form of a pyramid and includes one wall 82 having a resilient rubber pad 84 secured thereto. Another wall 85 has a triangular shape flange 87 extending therefrom. Actually, two flanges 87 could be used. The connecting struts 79 and 80 connect between walls 82 and 85.

In the embodiment shown in FIGS. 6 and 7, if the arm 70 is moved to a different angle, the flanges 75 simply rotate about shaft 76. By lifting the arm 70, the stabilizer pad 74 may be rotated about shaft 77 from the position shown in FIG. 6 to a position wherein the resilient pad 84 is in the horizontal or downward position.

FIGS. 8 and 9 show still another embodiment of this invention including a support arm 90 having a cylindrical extension 92. In this embodiment, the stabilizer pad 94 includes a flat plate 96 having triangular shape flanges 97 extending therefrom. The cylindrical arm 92 passes through accommodating holes in the flanges 97 and a pair of pins 98, for example, may be used to secure the stabilizer pad 94 relatve to the cylindrical extension 92.

The pad 94 is shown in FIG. 8 with its flanged side extending downwardly. In FIG. 9, there is shown the pin 98 passing through the flanges 97 and the extension 92 to secure the stabilizer pad in place. By removing the pins, the stabilizer pad may be rotated so that the resilient pad 99 is facing downwardly. The pins 98 may then be inserted to secure the stabilizer pad relative to its stabilizing arm.

FIGS. 10–12 show still another embodiment of the invention including a stabilizing or support arm 100 having a square shaped extension 102 having a hole passing therethrough for accommodating pin or bolt 104. As indicated in FIG. 10, the bolt 104 is secured by nut 106 threaded to its top end thereby securing the pin relative to the extension 102.

The stabilizer pad may be in a similar form to the one shown in FIGS. 1–3. The stabilizer pad 110 includes a flanged bottom 112 and a resilient top 114 as indicated in FIG. 10. In FIG. 11, the stabilizer pad is shown reversed with the resilient pad 114 on the bottom.

The pin or bolt 104 connects to a cross shaft 116. The pin 104 and shaft 116 may be in the form of the pivot mechanism shown in FIG. 7. The shaft 116, as indicated in FIG. 11 interconnects between flanges 118 which extend orthogonally from main plate 119 of the stabilizer 110.

As noted in FIG. 12, the stabilizer pad is cut-out at 120 so that the stabilizer pad can be rotated into its two different positions as depicted in FIGS. 10 and 11. It is noted that in FIG. 10 there is provided a second nut 107 disposed below extension 102. By providing both nuts 106 and 107 the stabilizer pad can be adjusted vertically by simply moving these nuts to different predetermined positions.

Figure 13:
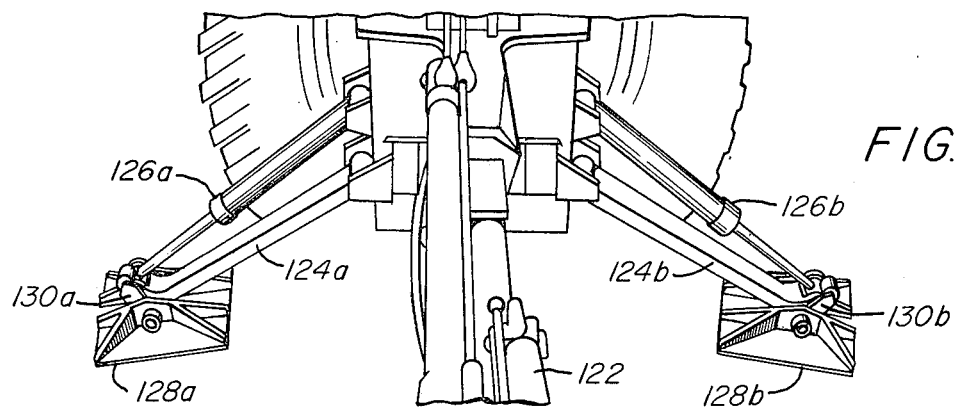
FIG. 13 is a fragmentary view of a typical loader/backhoe similar to FIG. 1, but showing the stop.

FIG. 13 is a fragmentary view of a typical loader/backhoe similar to that shown in FIG. 1, and including shovel mechanism 122, stabilizer arms 124a and 124b, hydraulic pistons 126a and 126b and stabilizer pads 128a and 128b. The stops 130a and 130b are also depicted in FIG. 13.

Figure 14:
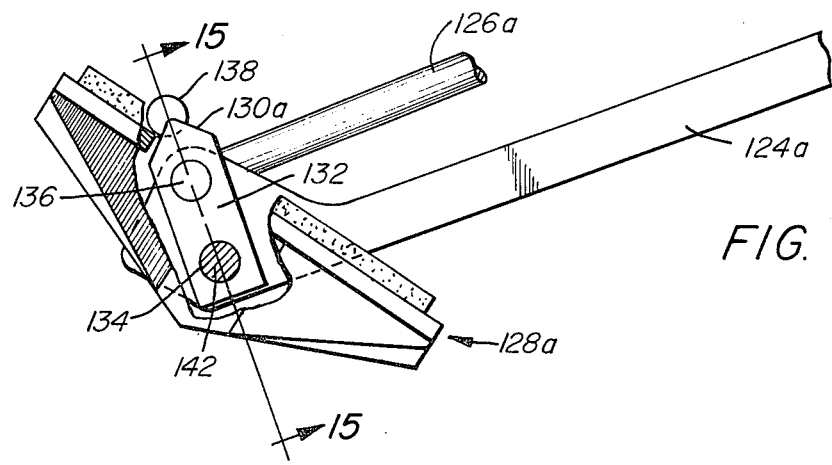
FIG. 14 is a cut away side view of a stabilizer pad similar to the one shown in FIG. 2 and including the limiting stop.
Figure 15:
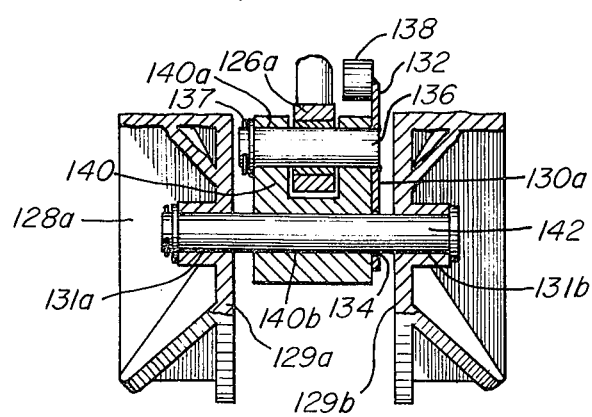
FIG. 15 is a front view of the arrangement shown in FIG. 14, partially cut away to indicate how the stop attaches to the arm and pad.

Regarding FIGS. 14 and 15, stop 130a includes bar 132 defining a circular cut-out 134 for accommodating pin 142, welded pin 136, and cylindrical stop 138. Stabilizer arm 124a includes a journal end 140 with passages 140a and 140b. Passage 140a, which is actually in two sections, accomodates welded pin 136 which is securely welded to bar 132 and is held in place by a cotter pin 137, for example. Pin 136 may alternatively be threaded to receive a nut in place of the cotter pin.

Stabilizer pad 128a includes flanges 129a and 129b (see FIG. 15) having respective holes 131a and 131b defined therein. Pin 142 passes through hole 131a, journal passage 140b, circular cut-out 134, and hole 131b and may be secured in place by cotter pins or the like at opposite ends.

When flanges 129a and 129b face downwardly to engage a terrain, cylindrical stop 138 prevents stabilizer pad 128a from rotating past the position shown in FIG. 14 thereby preventing the pad from contacting piston rod 126a. The pad may be rotated through an angle slightly greater than 180°.

FIGS. 16 and 17 show another embodiment of this invention. Stabilizer pad 144 which includes resilient surface 146, cut-outs 148a and 148b, and triangular supports 150a and 150b is secured to support arm 152 by means of pin 154 and suitable cotter pins or bolts. Pin 154 also supports retractable cleats 156a and 156b. Cleat 156a (see FIG. 16), for example, includes lock pin holes 158a and 158b. Cleat 156a pivots about pin 154 and can be locked in th the down position, shown by the solid outline, by passing lock pin 160a through lock pin hole 158a and a similar hole in triangular support 150a. Similarly, cleat 156a can be rotated up through cut-out 148a about pin 154 and locked in the up position, shown in dotted outline, by passing lock pin 160a through lock pin hole 158b and a similar hole in triangular support 150a.

When cleats 156a and 156b are in the down position, stabilizer pad 144 is suitable for use on a resilient surface, for example, gravel, while with cleats 156a and 156b in the up position, pad 144 is suitable for use on a rigid surface, for example, concrete.

Figure 19:
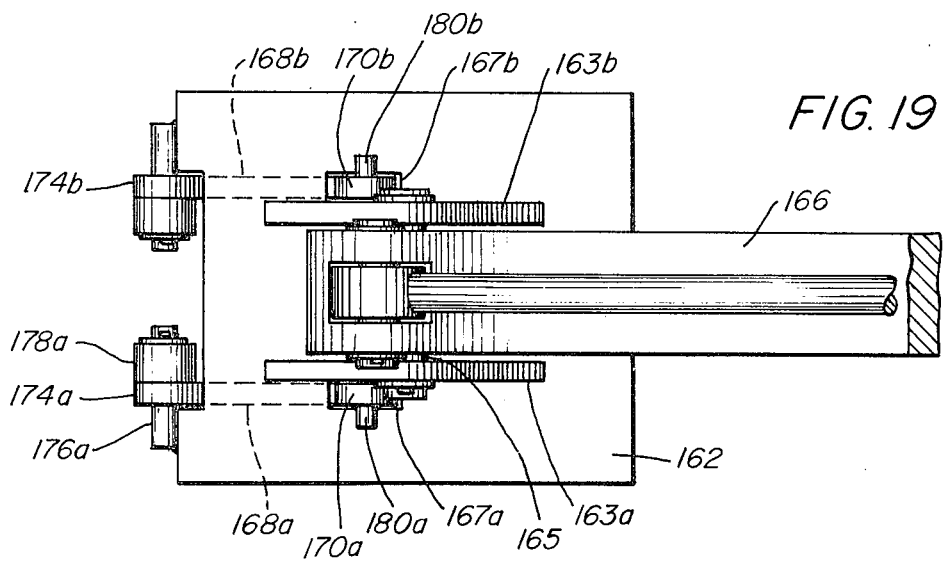
FIG. 19 is a plan view of the arrangement shown in FIG. 18.

A final embodiment of this invention is depicted in FIGS. 18 and 19. Stabilizer pad 162 includes resilient surface member 164, triangular supports 163a and 163b, cut-outs 167a and 167b for accomodating eyelet tabs 170a and 170b, respectively and is attached to support arm 166 by means of pin 165. Hinged cleats 168a and 168b include in addition to tabs 170a and 170b, eyelet tabs 174a and 174b, and holes 172a and 172b (not shown). Cleat 168a rotates about a pivot mechanism including welded pin 176a and support hub 178a. Welded pin 176a is attached to pad 162 and passes through eyelet 174a being secured by hub 178a and either a cotter pin or bolt.

For use on a resilient surface cleat 168a is rotated to the down position, indicated in solid outlines. Tab 170a passes through cut-out 167a and is secured by pin 180a passing through eyelet tab 170a , and a suitable hole in triangular support 163a. For use on a rigid surface, cleat 168a is rotated to the up position, indicated in dotted outline, and is secured by pin 180a passing through hole 172a and a suitable hole in triangular support 163a.

The cleat 168b is positioned and reversible in the same manner as discussed with reference to cleat 168a.

Having described a limited number of embodiments in this invention, it should now be apparent to one skilled in the art that numerous other embodiments and modifications thereof may be constructed, all of which are contemplated as falling with the spirit and scope of this invention.

What is claimed is:

1. For an earth moving apparatus having at least one support arm, a stabilizer pad comprising a plate-like piece having a resilient surface, means supporting said piece to an end of said arm, said piece being pivotable about said support means, the angle of rotation of said piece being at least a predetermined small angle, said piece having means defining a pivot axis fixed relative to said arm, at least one cleat and means supporting said cleat for rotation about said pivot axis wherein said cleat may be rotated to a downwardly facing terrain engaging position.

2. The stabilizer of claim 1 including means for securing said cleat to said piece when either said cleat is in a downwardly facing terrain engaging position or an upwardly facing non-terrain engaging position.

3. For an earth moving apparatus having at least one support arm, a stabilizer pad comprising a piece having a first relatively flat surface, means supporting said piece to an end of said arm, said piece being pivotable about said support means, wherein said piece has at least one cut-out section, and at least one pivotable cleat that rotates about said supporting means and through said cut-out section whereby said cleat may be moved to a downwardly facing terrain engaging position.

4. The stabilizer of claim 3 including means for securing said cleat to said piece when either said cleat is in a downwardly facing terrain engaging position or an upward non-terrain engaging position.

5. For an earth moving apparatus having at least one support arm, a stabilizer pad comprising a piece having a first relatively flat surface, means supporting said piece to an end of said arm in a terrain engaging position, said piece being pivotable about said support means, the angle of rotation of said piece being at least a predetermined small angle, said piece having means defining a pivot axis, a flanged means associated with said piece and means for supporting said flanged means at said pivot axis, wherein said flanged means defines a cleat pivotable between two positions and either extending downwardly below the flat surface or disposed above the flat surface in the second position while said piece being maintained in said terrain engaging position.

6. A stabilizer pad as set forth in claim 5 wherein said pivot axis and the pivot axis of said piece relative to said support arm are in line.

7. A stabilizer pad as set forth in claim 5 including means for fixing the position of said cleat relative to said piece.

* * * * *